United States Patent [19]

Yang

[11] Patent Number: 5,631,711
[45] Date of Patent: May 20, 1997

[54] BACKGROUND-PICTURE COMPENSATING CIRCUIT USING ON-SCREEN DISPLAY SIGNALS

[75] Inventor: Jae-Mo Yang, Suwon, Rep. of Korea

[73] Assignee: Samsung Electronics Co., Ltd., Kyungki-do, Rep. of Korea

[21] Appl. No.: 433,058

[22] Filed: May 3, 1995

[30] Foreign Application Priority Data

Jun. 9, 1994 [KR] Rep. of Korea ............... 94-12948

[51] Int. Cl.$^6$ ............................................. H04N 5/445
[52] U.S. Cl. ......................... 348/563; 348/564; 348/569
[58] Field of Search ........................... 348/569, 563, 348/598, 599, 600, 589, 588, 586, 564, 565, 566; 345/114, 116; H04N 5/445, 5/45, 5/50, 9/74, 9/76

[56] References Cited

U.S. PATENT DOCUMENTS

| 5,206,728 | 4/1993 | Kim | 348/564 |
| 5,461,398 | 10/1995 | Tang | 348/589 |

FOREIGN PATENT DOCUMENTS 61-269573  11/1986  Japan .

Primary Examiner—Sherrie Hsia
Attorney, Agent, or Firm—Sughrue, Mion, Zinn, Macpeak & Seas

[57] ABSTRACT

A background-picture compensating circuit using an OSD signal for performing a half tone function without requiring a half tone circuit includes a video signal processor for separating a received composite video signal into R, G, B signals, a microcomputer for muting the R, G, B outputs of the video signal processor upon the receipt of an OSD character display key input to supply a signal for a background picture of the OSD character, and a CRT driver for amplifying respective R, G, B signals from the video signal processor or microcomputer to provide the amplified signals to a cathode of a CRT, in which the microcomputer supplies pulses of a high frequency in response to an input of the signal for the background picture of the OSD character to swiftly repeat On/Off operation of the output of the R, G, B signals of the video signal processor on the background picture of the OSD character for making the background picture level lower than a surrounding level, thereby enabling a display of both an original picture covered by the background picture and the OSD character, simultaneously without any additional half tone circuit.

2 Claims, 2 Drawing Sheets

BACKGROUND-PICTURE COMPENSATING CIRCUIT USING ON-SCREEN DISPLAY SIGNALS

BACKGROUND OF THE INVENTION

1. Field of the Invention

The present invention relates to a background-picture compensating circuit using an on-screen display (hereinafter referred to as "OSD") signal. More particularly the invention relates to a background-picture compensating circuit using an OSD signal, wherein a window for an OSD character background picture is set around a predetermined portion of the OSD characters. The background picture level is made lower than the surrounding picture level by performing a half tone function without any separate half tone circuit therefor. An original picture is displayed covered by the background picture and the OSD characters.

2. Description of the Prior Art

The half tone function generally means that the luminance level around an OSD character becomes lower than that of an original picture signal to improve the OSD character display. Typically, the half tone is carried out by using an integrated circuit provided with the half tone function. This complicates the circuitry and increases its cost.

Japanese Laid-open Publication No. 61-269573 entitled "Half Tone Processing Circuit in a Television" discloses a technique whereby a half tone signal received during a blanking pulse output period of a character signal is supplied to a video signal processing circuit as a beam current limit signal for lowering luminance around the characters, so that the characters can easily be visually distinguished.

In other words, the prior art carries out the half tone function in such a manner that an automatic luminance limit circuit for providing the beam current limit signal to automatically control the luminance is supplied with the half tone signal during the blanking pulse output period of the character signal, and the half tone signal is then transmitted to the video signal processing circuit to thereby lower the luminance around the characters.

In the above construction, however, the luminance around the characters can be lowered by the half tone signal, but the half tone signal is supplied from an additional half tone circuit to thereby complicate the circuitry and increase cost.

SUMMARY OF THE INVENTION

The present invention is directed to solve the above-described problems. Accordingly, it is an object of the present invention to provide a background-picture compensating circuit using an OSD signal for performing a half tone function that lowers a background picture level of an OSD character from the surrounding picture level without an additional half tone circuit.

To achieve the above object of the present invention, there is provided a background-picture compensating circuit using an on-screen display signal, which comprises a CRT driving circuit, a video signal processing circuit which differentiates a received composite video signal into R, G, B signals to output the differentiated R, G, B signals from its R, G, B signal terminals to a CRT driving circuit, and a microcomputer having OSD R, G, B signal terminals connected to the CRT driving circuit commonly with the R, G, B signal terminals of the video signal processing circuit, and an OSD fast blanking signal terminal of the microcomputer commonly connected to ground with a fast blanking signal terminal of the video signal processing circuit for supplying pulses of a high frequency as an OSD fast blanking signal to swiftly repeat On/Off operation of the output of the R, G, B signals from the video signal processing circuit on the background picture of the OSD character, the CRT driving circuit amplifying the R, G, B signals from either one of the video signal processing circuit and the microcomputer to output to a cathode of a CRT.

BRIEF DESCRIPTION OF THE DRAWINGS

The above objects and other advantages of the present invention will become more apparent by describing in detail preferred embodiments thereof with reference to the attached drawings in which.

DETAILED DESCRIPTION OF THE PREFERRED EMBODIMENT

Figure 1:
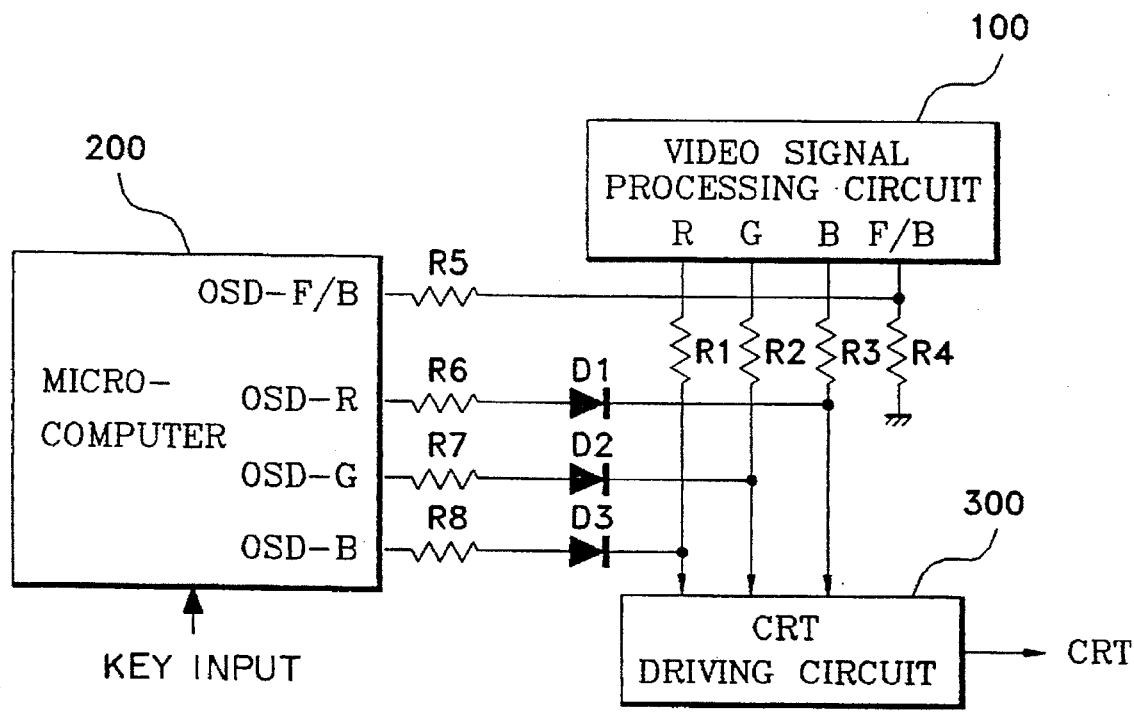
FIG. 1 is a circuit diagram showing a preferred embodiment of a background-picture compensating circuit using an OSD signal according to the present invention.

Referring to FIG. 1 which shows a background-picture compensating circuit using an OSD signal according to the present invention, a video signal processing circuit 100 displays an original picture by separating a composite video signal into R, G, B signals upon receiving the composite video signal and supplies the R, G, B signals to a CRT driving circuit 300. The video signal processing circuit has a fast blanking signal terminal F/B for muting the R, G, B signal outputs when a predetermined voltage is applied to the video signal processing circuit 100.

A microcomputer 200 has an OSD fast blanking signal terminal OSD-F/B for supplying the predetermined voltage to the fast blanking signal terminal F/B and OSD R, G, B signal terminals OSD-R, OSD-G and OSD-B for supplying the R, G, B signals of an OSD character while muting the R, G, B signals of the video signal processing circuit 100.

The R, G, B output terminals R, G and B of the video signal processing circuit 100 are respectively connected to the CRT driving circuit 300 via bias resistors R1 to R3. Commonly, the OSD R, G, B output terminals OSD-R, OSD-G and OSD-B of the microcomputer 200 are respectively connected to the CRT driving circuit 300 via bias resistors R6 to R8 and backward-current preventing diodes D1 to D3.

The fast blanking signal terminal F/B of the video signal processing circuit 100 is grounded via a resistor R4. Commonly, the OSD fast blanking signal terminal OSD-F/B of the microcomputer 200 is grounded via a resistor R5. Here, the OSD fast blanking signal terminal OSD-F/B of the microcomputer 200 supplies the predetermined voltage to the video signal processing circuit 100 to mute the R, G, B signals and, simultaneously, to form a window of a predetermined color around the OSD character for clearly displaying the OSD character during displaying time.

Figure 2:
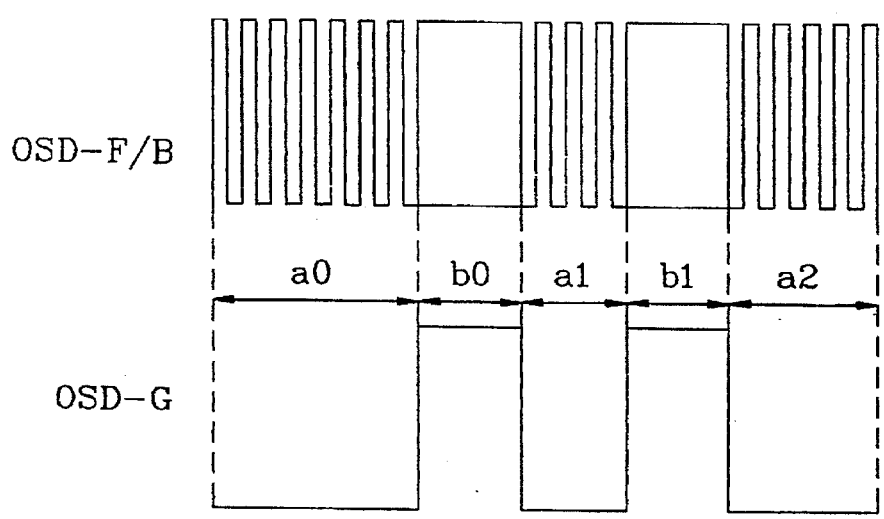
FIG. 2 is an operational timing chart of the microcomputer shown in FIG. 1.

At this time, pulses having a high frequency as illustrated by reference numerals $a_0$, $a_1$, and $a_2$ of FIG. 2 are provided to allow the OSD fast blanking signal OSD-F/B to perform the half tone function.

In FIG. 2, reference numerals $b_0$ and $b_1$ designate OSD R, G, B signals from the microcomputer 200.

In the circuit constructed as above, when a predetermined key such as a volume up/down key or channel up/down key is pressed for displaying the OSD character, the microcomputer 200 mutes the R, G, B signals output from the video signal processing circuit 100 and supplies the R, G, B signals of the OSD character and a signal for the background picture of the OSD character, In more detail, the microcomputer 200 supplies the predetermined voltage, e.g., 5 V to the fast blanking signal terminal F/B of the video signal processing circuit 100 from the OSD blanking signal terminal OSD-F/B via the resistor R5 in order to display the changed state of the volume or channel into the OSD character.

Once a voltage of 5 V is supplied to the fast blanking signal terminal F/B of the video signal processing circuit 100, the R, G, B signal outputs are cut off by imposing high impedance to the R, G, B outputs of the video signal processing circuit 100.

At the same time, the OSD R, G, B outputs from the microcomputer 200 are supplied to the CRT driving circuit 300 via the resistors R6 to R8 and diodes D1 to D3, so that the OSD character is displayed where the R, G, B signals of the video signal processing circuit 100 are muted.

The OSD fast blanking signal OSD-F/B of the microcomputer 200 is provided to the window portion that displays the background picture of the OSD character as a pulse having a high frequency as illustrated by the reference numeral $a_0$ of FIG. 2.

When the OSD fast blanking signal shown in FIG. 2 is supplied to the fast blanking signal terminal F/B of the video signal processing circuit 100, the R, G, B signals of the video signal processing circuit 100 are repeatedly subject to a rapid ON/OFF operation at the background picture position of the OSD character.

That is, if the OSD fast blanking signal OSD-F/B of the microcomputer 200 supplied to the video signal processing circuit 100 is a high level signal, the R, G, B signals of the video signal processing circuit 100 are muted; otherwise, the R, G, B signals of the video signal processing circuit 100 are output normally. Accordingly, when the OSD fast blanking signal as illustrated by $a_0$ of FIG. 2 is received into the fast blanking signal terminal F/B of the video signal processing circuit 100, the background picture and an original picture swiftly repeat an On/Off operation at the background picture position of the OSD character.

Figure 3:
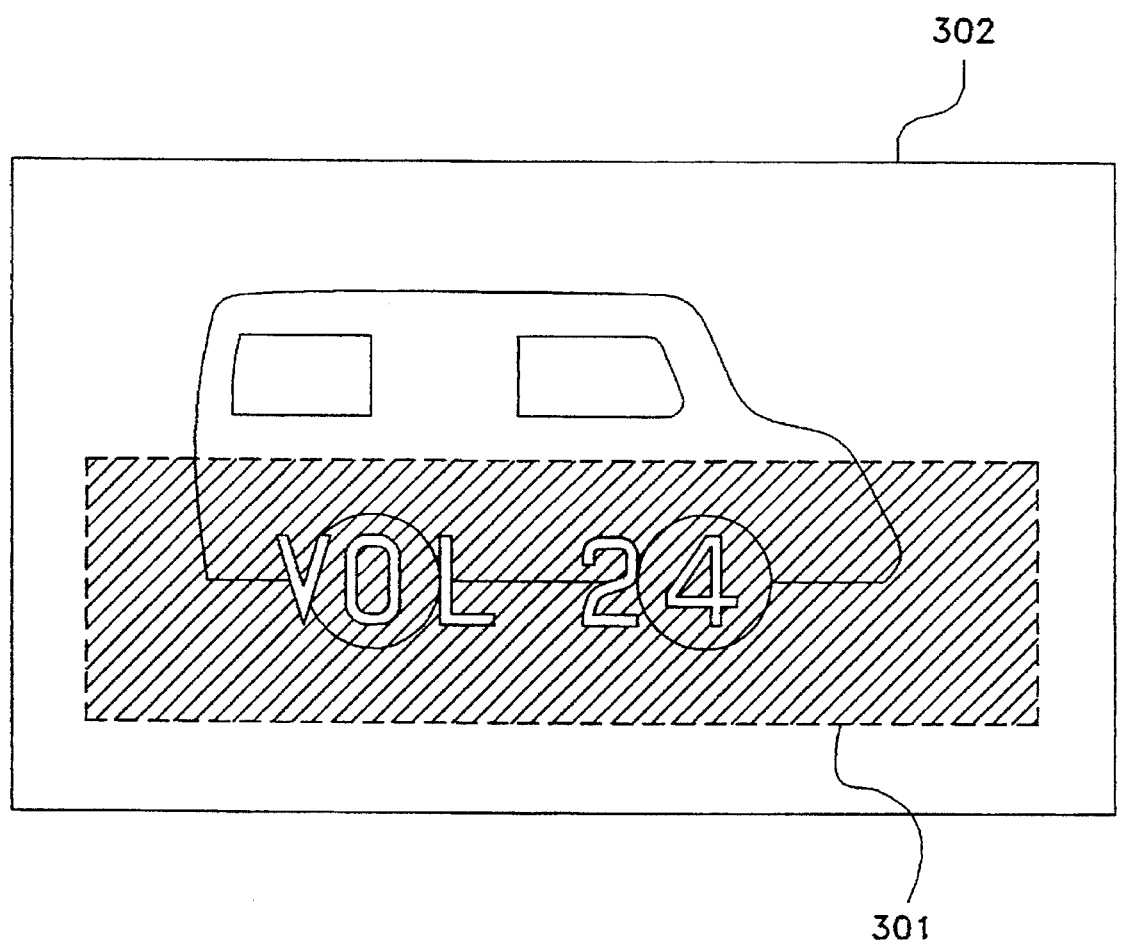
FIG. 3 is a view showing a preferred embodiment of an OSD character displayed by performing the half tone function in accordance with the background-picture compensating circuit of FIG. 1.

Therefore, as shown in FIG. 3, the background picture portion 301 around the OSD character is less bright than the surrounding picture 302, but the original picture can be seen at the background picture portion 301 by performing the half tone function.

By employing a background-picture compensating circuit using an OSD signal according to the present invention as described above, a window for a background picture is set at a predetermined portion around an OSD character, and the On/Off operation of the background picture and an original picture are swiftly repeated when the OSD character is displayed to make the background picture level lower than the surrounding level. Consequently, both the original picture covered by the background picture of the OSD character and the OSD character are simultaneously displayed by performing the half tone function by means of simple circuitry which does not require an additional half tone circuit, thereby decreasing cost.

While the present invention has been particularly shown and described with reference to a particular embodiment thereof, it will be understood by those skilled in the art that various changes in form and details may be effected therein without departing from the spirit and scope of the invention as defined by the appended claims.

What is claimed is:

1. A background-picture compensating circuit comprising:

CRT driving means for outputting a CRT signal to a CRT;

video signal processing means for differentiating a video signal into R, G and B signals, and for outputting said R, G and B signals to said CRT driving means, said video processing means having a fast blanking terminal;

computing means for outputting OSD-R, OSD-G and OSD-B signals representing an OSD character, and for outputting a fast blanking signal to said fast blanking terminal, said OSD-R, OSD-G and OSD-B signals and said fast blanking signal being output in response to a key input for displaying the OSD character, said fast blanking signal causing said video signal processing means to rapidly repeat an on/off operation, wherein said on/off operation causes the R, G and B signals to be applied to said CRT driving means when said OSD-R, OSD-G and OSD-B signals are not being output to said CRT driving means so as to establish a background for the OSD character, and said on/off operation causes the R, G and B signals to not be applied to said CRT driving means when said OSD-R, OSD-G and OSD-B signals are being output to said CRT driving means.

2. A background-picture compensating circuit as set forth in claim 1, wherein said video signal processing means has separate R, G and B terminals and said computing means has separate OSD-R, OSD-G and OSD-B terminals commonly connected to the R, G and B terminals respectively of said video signal processing means.

* * * * *